United States Patent
Rao et al.

(10) Patent No.: US 7,277,528 B2
(45) Date of Patent: Oct. 2, 2007

(54) CALL-CONTENT DETERMINATIVE SELECTION OF INTERCEPTION ACCESS POINTS IN A SOFT SWITCH CONTROLLED NETWORK

(75) Inventors: Nagaraja Rao, Boca Raton, FL (US); Ludger Schlicht, Boca Raton, FL (US)

(73) Assignee: Siemens Information and Communication Networks, Inc.- Boca Raton, Boca Raton, FL (US)

( * ) Notice: Subject to any disclaimer, the term of this patent is extended or adjusted under 35 U.S.C. 154(b) by 1047 days.

(21) Appl. No.: 10/365,299

(22) Filed: Feb. 12, 2003

(65) Prior Publication Data

US 2003/0219103 A1 Nov. 27, 2003

Related U.S. Application Data

(60) Provisional application No. 60/356,477, filed on Feb. 12, 2002.

(51) Int. Cl.
*H04M 3/22* (2006.01)
*H04L 12/56* (2006.01)

(52) U.S. Cl. .......... 379/32.01; 370/389; 379/32.02; 379/32.04; 379/32.05; 379/35

(58) Field of Classification Search .......... 370/352, 370/356, 389, 40; 379/32.01–32.05, 35
See application file for complete search history.

(56) References Cited

U.S. PATENT DOCUMENTS

| | | | | |
|---|---|---|---|---|
| 5,822,404 A | * | 10/1998 | Cave | 379/88.13 |
| 5,838,768 A | * | 11/1998 | Sumar et al. | 379/88.14 |
| 5,923,744 A | | 7/1999 | Cheng | 379/207 |
| 6,075,843 A | * | 6/2000 | Cave | 379/88.13 |
| 6,078,648 A | | 6/2000 | Albers et al. | 379/35 |
| 6,097,798 A | | 8/2000 | Albers et al. | 379/114 |
| 6,229,887 B1 | | 5/2001 | Albers et al. | 379/219 |
| 6,233,313 B1 | | 5/2001 | Farris et al. | 379/34 |
| 6,324,279 B1 | | 11/2001 | Kalmanek, Jr. et al. | 379/229 |
| 6,674,767 B1 | * | 1/2004 | Kadyk et al. | 370/466 |
| 6,697,468 B2 | * | 2/2004 | Wong et al. | 379/112.01 |
| 6,741,595 B2 | * | 5/2004 | Maher et al. | 370/392 |

* cited by examiner

*Primary Examiner*—Harry S. Hong

(57) ABSTRACT

By selecting access points specific to the various components of call-content of a call, a monitoring agency is ensured of obtaining the call-content of each participant in telephone call irrespective of call transfers and network reconfiguration. Devices in the telecommunications system such as network devices can provide appropriate access. Examples of suitable network devices may include gateway, an access gateways, trunk gateways, portals, ATM switches, routers, and border elements.

22 Claims, 8 Drawing Sheets

Fig. 5
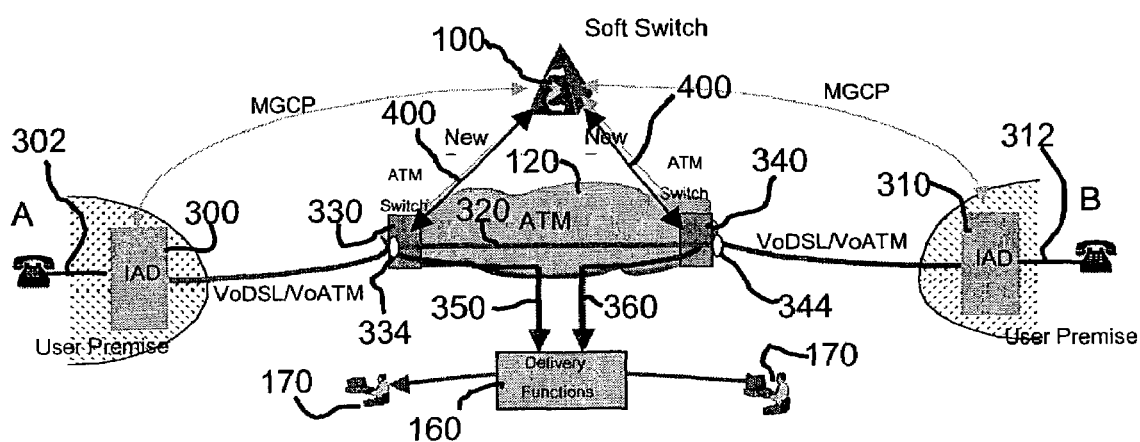
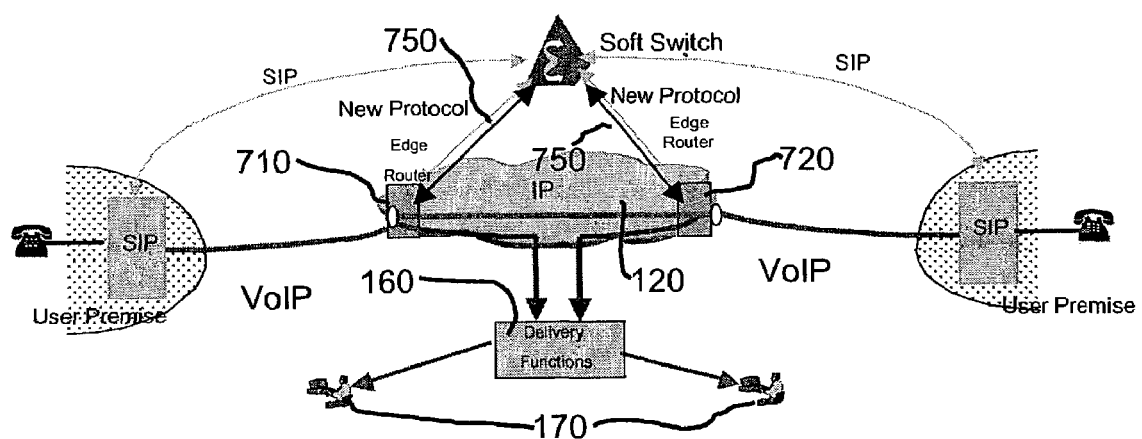
Fig. 7

CALL-CONTENT DETERMINATIVE SELECTION OF INTERCEPTION ACCESS POINTS IN A SOFT SWITCH CONTROLLED NETWORK

CROSS-REFERENCE TO RELATED APPLICATIONS

This application is related to and claims the benefit of commonly-owned U.S. Provisional Application No. 60/356,477, filed Feb. 12, 2002, titled "Distributed Intercept Access Points in an NGN Voice over Packet Network;" U.S. Provisional Applications Nos. 60/279,275 and 60/279,279, both filed Mar. 28, 2001; U.S. application Ser. No. 10/109,293, titled Method and Apparatus for a Distributed Architecture Telecommunications Software Switch, filed Mar. 28, 2002; all incorporated by reference herein in their entirety.

BACKGROUND OF THE INVENTION

Through the passage of the Communications Assistance for Law Enforcement Act of 1994 (CALEA), 47 U.S.C. §§ 1001-1010, the United States has mandated that telecommunications carriers provide law enforcement agencies with access to the telecommunications networks to enable lawfully-ordered intercept of the voice content of telecommunications. Industry standards such as Lawfully Authorized Electronic Surveillance (ANSI-J-STD-025A), incorporated by reference herein, provide a framework for achieving this goal.

When a person involved in a call has been identified as an intercept subject, i.e., the person under law enforcement surveillance, one or more law enforcement agencies may seek to obtain the call content transmitted and received by that person. In a traditional public switched telephone network ("PSTN"), this is a reasonably straightforward undertaking. There, the bearer path (or paths) of calls are routed through fixed points for the duration of the call. To intercept the call content, all that is usually required is access to one of these fixed points.

By contrast, the interception of the transmitted and received call content in a soft switch environment presents certain challenges not encountered in the traditional network. Under the soft switch scheme, the call content travels along bearer paths that may be reconfigured during the course of a call and, hence, the paths themselves may be routed through different points over the course of that call. Thus, while a desired component of the call content may be passing through a given point at the outset of a call, after reconfiguration it may no longer be accessible from that point. For example, this may occur when telephone calls are handed off in transfers and forwarded calls. Therefore, one access point will not necessarily provide access to the transmitted and received call content for the duration of the call.

The difficulties discussed above may be overcome in part by selecting access points in the telecommunications system from which to obtain the various components of the call content, namely, the intercept subject's transmitted call content and the call content received (or that could be received) by the intercept subject from other parties to a call. Since the call content transmitted and received by the intercept subject must pass through some point in the telecommunications system, any point within the system will suffice for access to that component, provided that it passes through that point irrespective of any reconfiguration of the bearer path. Another criteria is that the device be capable of receiving and responding to instructions from the soft switch. One type of device where a call component may be obtained is a network device controlled by a soft switch, at or near the periphery of the network where the call content enters or passes into the network. Examples of network devices include access gateways, media gateways, network edge devices, trunk gateways, and border elements, although this list is not exclusive.

In some telecommunications systems, however, there is no convenient network device such as a gateway that will provide an access point for an unobtrusive interception. Rather, the subscriber or participant connects directly to the network through an access device on its premises and therefore interception of call content at such points might be detected by the intercept subject. In such a case, a soft switch-controlled network device through which a subscriber connects, such as an ATM switch, an edge router, or another border element, may provide a point for interception of a call content component.

BRIEF DESCRIPTION OF THE DRAWINGS

FIG. 5 is a block diagram of a VoDSL telecommunications system incorporating a soft switch and the logical connections for a two-party call interception;

FIG. 7 is a block diagram of an SIP-based telecommunications system incorporating a soft switch and the logical connections for a two-party call interception.

DESCRIPTION OF THE INVENTION

Figure 1:
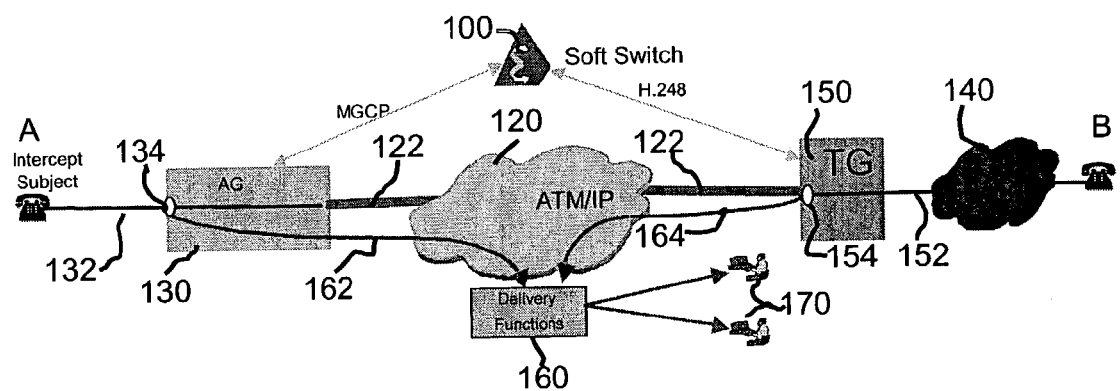
FIG. 1 is a block diagram of a telecommunications system incorporating a soft switch and the logical connections for a two-party call interception.

In the soft switch-controlled telecommunications system shown in FIG. 1, calls enter the switching network through traditional PSTN routes as well as through various gateways. A soft switch 100 controls the flow of calls through the network 120, shown as a cloud bearing the label ATM/IP in the figure. Although the network 120 may utilize ATM and/or IP protocols, the network could use other protocols.

One subscriber—"subscriber A" (also bearing the label "intercept subject")—connects to the telecommunications system through an access gateway 130 via a line 132 and wishes to call another subscriber, subscriber B. Subscriber B receives telephone service through a PSTN (public switched telephone network) 140; the PSTN has a connection to the network 120 through a trunk gateway 150.

Two-Party Call Scenario

In this scenario, subscriber A wishes to call subscriber B. While this discussion and the succeeding ones will discuss call setup in the context of SS7 and internet protocol switching systems, other switching protocols could be employed. Further, the soft switch 100 may provide its instructions to components of the telecommunications system such as the various gateways using a protocol such as the Media Gateway Control Protocol (MGCP) or H.248 or, if need be, extensions of an existing protocol or an entirely new protocol.

Two-Party Call Setup

When subscriber A goes off-hook (i.e., picks up the handset), the access gateway 130 detects the off-hook condition and notifies the soft switch 100. After confirming that the appropriate features are available to subscriber A and that the subscriber is attempting to originate a call, the soft switch 100 instructs the access gateway 130 to apply dial tone to subscriber A and collect the dialed digits.

The access gateway 130 sends the collected digits—the telephone number of subscriber B in this instance—to the soft switch 100. The soft switch 100 translates the collected digits and determines how the call must be routed. In the example shown in FIG. 1, the soft switch 100 determines that to reach the requested destination (subscriber B), the call must be routed through the PSTN 140, while the PSTN 140 itself is connected to the network 120 through a trunk gateway 150. Therefore, the soft switch 100 instructs the trunk gateway 150 to seize an outgoing trunk 152 connecting to the PSTN 140. However, if subscriber B had been on a different network, the destination could have been another appropriate gateway or any other network or telecommunications system entry or access point.

The soft switch 100 then directs the access gateway 130 and the trunk gateway 150 to begin to set up a bearer path 122 through the network 120. The soft switch 100 provides the gateways 130 and 150 with the addresses of each other to enable them to establish the bearer path 122. The soft switch 100 further provides information to the PSTN 140 for routing the call to its destination (subscriber B). Finally, the soft switch 100 instructs the gateways 130 and 150 to connect the bearer path in both directions and to subscriber A's line 132 and the trunk 152 to the PSTN 140, respectively.

A switch (or multiple switches; not shown) within the PSTN 140 will set up the call to subscriber B, alerting the subscriber that there is an incoming call. When subscriber B answers, the switch serving subscriber B will send an answer message back towards subscriber A. A bearer path connection is then established between subscriber B and the PSTN 140.

Subscribers A and B are now in communication with each other and the telecommunications system awaits the next call supervision signal. When the call is concluded, the bearer path 122 released and the system will await signalling indicating the initiation of the next event.

Two-Party Call Content Interception

Figure 2:
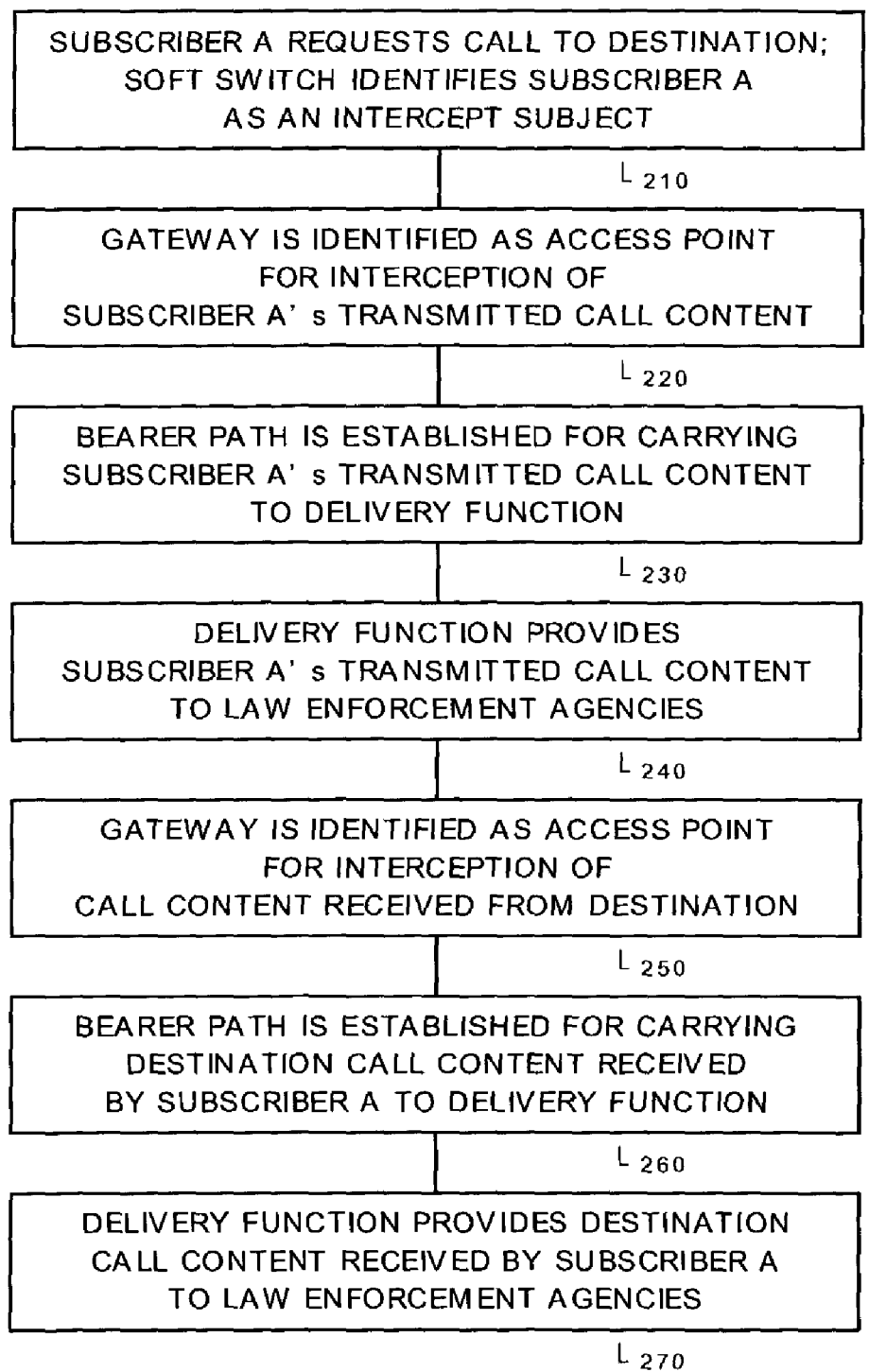
FIG. 2 is a flow chart of an interception process for use with the arrangement illustrated in FIG. 1.

When the soft switch 100 receives a request involving subscriber A, it determines from an internal database that subscriber A has been designated an intercept subject by law enforcement. The switch 100 will now begin the process of intercepting the intercept subject's transmitted call content and the call content the subject receives (or could receive) from other parties, and channel that content to one or more law enforcement agencies (LEAs) 170. To achieve this interception, several other steps, outlined in the flow chart of FIG. 2, may occur concurrently with the setup of the call from subscriber A to subscriber B.

Initially, an access point for intercepting the call content transmitted by subscriber A must be identified. In FIG. 1, as noted previously, subscriber A connects to the telecommunications system through the access gateway 130 via its line 132. Since subscriber A's transmitted call content passes through the access gateway 130 and the gateway 130 is responsive to instructions from the soft switch 100, the soft switch 100 selects this device as an access point 134 for interception (schematically depicted as an oval). In that regard, the access gateway 130 could have been previously associated with subscriber A and that association could have been stored in a database available to the soft switch 100. The mechanism for identifying the access point may be software, firmware, a hardware device, or some combination thereof.

A delivery function 160, realized in hardware, software, firmware, or some combination thereof, routes the desired call content from the network 120 to the law enforcement agencies 170. A database in the soft switch 100 contains the destination addresses of the law enforcement agencies entitled to receive the transmitted and received call content of subscriber A. Similarly, since the delivery function 160 is the interface between the network 120 and the law enforcement agencies 170, the database also contains information for routing the intercepted call content through the delivery function 160 to reach the law enforcement agencies 170. It should be understood that the soft switch 100 controls the delivery function 160. For clarity in presentation, a line depicting the control function and the associated protocol (e.g., MGCP, H.248, or other) running from the soft switch 100 to the delivery function 160 is not shown in FIG. 1. Similarly, the corresponding line in FIGS. 3, 5, 7, and 8 (here soft switch 800 to delivery function 160) have also been omitted for clarity.

The soft switch 100 will instruct the access gateway 130 and the delivery function 160 to begin the setup of a channel such as a bearer path 162 between the intercept subject and the LEA for carrying subscriber A's transmitted call content. The soft switch 100 provides the access gateway 130 and the delivery function 160 with the addresses of each other to enable them to establish the bearer path 162. The soft switch 100 will also instruct the delivery function 160 to seize the facilities of the law enforcement agencies 170. The method for achieving this will depend in part on how the law enforcement agencies 170 connect to the delivery function 160.

The soft switch 100 then instructs the access gateway 130 to establish a local, one-way bearer path connection (internal to the gateway 130) between the line 132 connecting subscriber A to the access gateway 130 and the gateway's local address of the bearer path 162. The soft switch 100 will further instruct the delivery function 160 to establish connections to the bearer path 162 to convey the subscriber A's transmitted call content captured at the access gateway 130 to one or more law enforcement agencies 170.

Complementary-wise, when the soft switch 100 learns that subscriber A is attempting to place a call to a destination, it instructs the delivery function 160 to setup a second bearer path 164 between subscriber B and the LEA to convey the call content originating from subscriber B to be received by subscriber A. As a preliminary matter, however, the soft switch 100 must identify a point from which to access this new call content.

Based on the digits collected by the access gateway 130 during the call setup procedure, the switch 100 understands that this new destination is reached through the trunk gateway 150, a device through which the desired call content will pass and one responsive to instructions from the soft switch 100. Therefore, the trunk gateway 150 will provide an access point 154 (schematically depicted as an oval).

Thus, the soft switch 100 will instruct the trunk gateway 150 and the delivery function 160 to begin the setup of a new bearer path 164 between them for carrying the responsive call content received from subscriber B, providing the trunk gateway 150 and the delivery function 160 with the addresses of one another to enable them to establish the bearer path 164.

The soft switch 100 will again instruct the delivery function 160 to seize the facilities of the law enforcement agencies 170 to create a second channel to the law enforcement agencies 170 for the additional call content from subscriber B. Alternatively, the received call content could be added to the transmitted call content of subscriber A, reducing the number of facilities required for the interception.

The soft switch 100 will then instruct the trunk gateway 150 to establish a local, one-way bearer path connection (internal to the trunk gateway 150) between the trunk 152 carrying the call content received from the destination and the gateway's local address of the bearer path 164. The soft switch 100 will also instruct the delivery function 160 to establish connections to the bearer path 164 to send the received call content received to one or more law enforcement agencies 170.

When the call concludes, the connections are torn down and all bearer paths and lines are cleared.

In practice, the steps of call setup and interception would likely occur nearly simultaneously, i.e. the setup of bearer paths for connecting the subscribers and the setup of bearer paths to the delivery function occur at the same time. Since in the access gateway 130 provides an anchor point for the bearer path 122 between the subscribers, the soft switch 100 can direct that it also serve as the point for interception and the interception bearer path 162 for subscriber A's call content. Therefore, the identification and selection of an intercept point may occur simultaneously with the soft switch's 100 selection of the network devices for call completion bearer paths.

Three-Party Call Scenario

Figure 3:
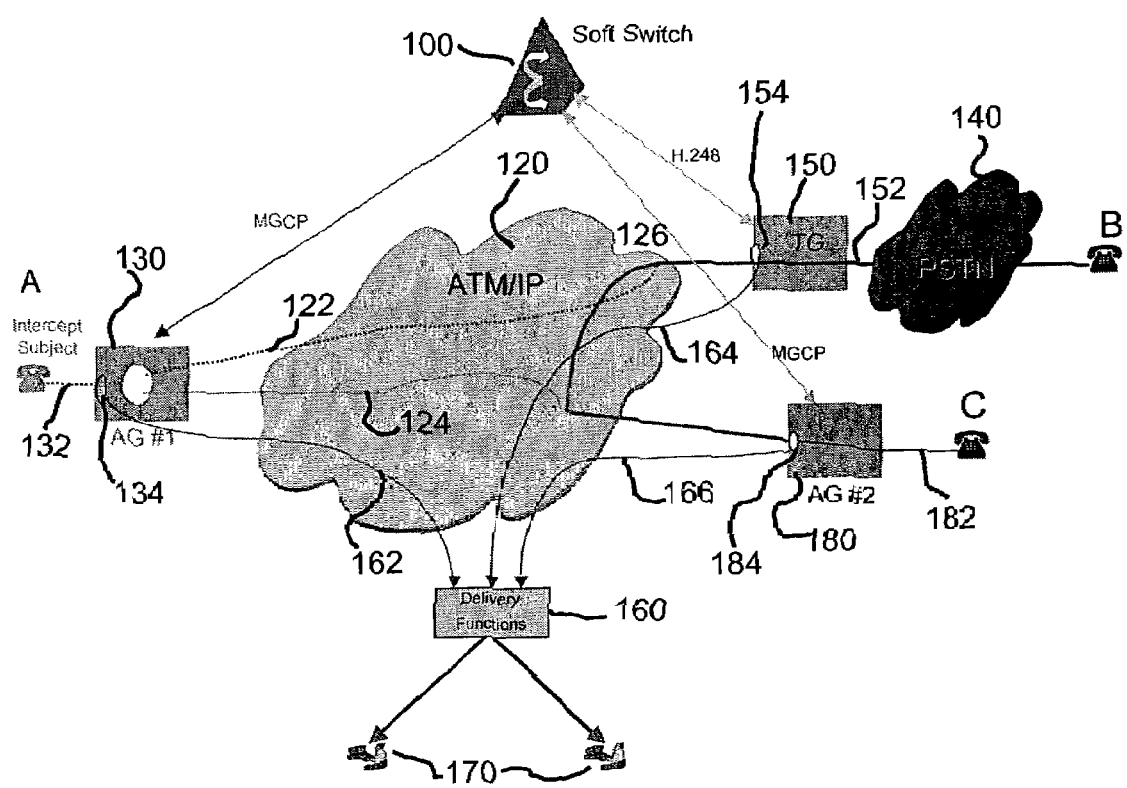
FIG. 3 is a block diagram of a telecommunications system incorporating a soft switch and the logical connections for a three-party call interception.

The following discussion relates to a three-party call scenario topologically depicted in FIG. 3. In this example, subscriber B calls the intercept subject, subscriber A, and subscriber A transfers the call to another party, subscriber C.

Call Setup

Initially, subscriber B goes off-hook and a switch (not shown) serving subscriber B, within the PSTN 140, detects the off-hook condition, collects the dialed digits, and the PSTN 140 routes the call information to the soft switch 100. The soft switch 100 translates the dialed digits, determines that the requested destination is a subscriber it serves, and instructs the trunk gateway 150 to seize the incoming trunk 152. The soft switch 100 also determines that the destination is served by the access gateway 130 serving subscriber A ("subscriber A's access gateway) and instructs the gateway 130 to seize the line 132 serving subscriber A.

The soft switch 100 then directs subscriber A's access gateway 130 and the trunk gateway 150 to begin set up of a bearer path 122 through the network 120. The soft switch 100 provides the gateways 130 and 150 with the addresses of each other to enable them to establish the path.

The soft switch 100 further instructs the access gateway 130 to alert subscriber A that there is an incoming call. It also instructs the trunk gateway 150 to connect the bearer path 122 to the trunk 152 for the transmission of call content in both directions. When subscriber A answers, the access gateway 130 notifies the soft switch 100 and the soft switch 100 then instructs subscriber A's access gateway 130 to set up bearer path connections between the line 132 and the bearer path 122 for the transmission of call content in both directions. Subscribers A and B are now in communication with each other and the telecommunications system awaits the next call supervision signal.

In the three-party example of FIG. 3, subscriber A wishes to transfer the call to another party, subscriber C. Subscriber A uses whatever method is appropriate (e.g., switch hook-flash) to signal that it wishes to contact another party.

Upon receiving the request for a line, the soft switch 100 determines that subscriber A is permitted to contact a third subscriber (i.e., the features to accomplish the call are available to subscriber A) and instructs subscriber A's access gateway 130 to apply recall dial tone to subscriber A. The soft switch 100 also instructs the gateway 130 to adjust the directional bearer path connection from subscriber A to subscriber B, sending a quiet tone to subscriber B during the process of establishing a connection with subscriber C. Subscriber A then dials the digits, and its access gateway 130 collects those digits for the soft switch 100. The soft switch 100 determines that the requested destination is a subscriber it serves through a second access gateway 180 ("subscriber C's access gateway") and instructs this second access gateway 180 to seize subscriber C's line 182.

The soft switch 100 then directs subscriber A's and C's access gateways 130 and 180 to begin set up of a bearer path 124 between them through the network 120. The soft switch 100 provides the gateways 130 and 180 with the addresses of each other to enable them to establish the path.

The soft switch 100 now instructs subscriber C's access gateway 180 to alert subscriber C that there is an incoming call. Subscriber A's access gateway is also instructed to set up bearer path connections between the line 132 and the bearer path 124 to permit call content to be transmitted in both directions. When subscriber C answers, the access gateway 180 notifies the soft switch 100 and the soft switch 100 then instructs subscriber C's access gateway 180 to connect the bearer path 124 to permit call content to be transmitted in both directions.

Subscribers A and C are now in conversation. Subscriber A now initiates a transfer of subscriber B to subscriber C by going on-hook—its access gateway 130 detects the on-hook condition and notifies the soft switch 100. After confirming that subscriber A is requesting a transfer of the call on hold (subscriber B) and that it possesses the required features, the soft switch 100 then directs subscriber C's access gateway 180 and the trunk gateway 150 to begin set up of a bearer path 126, providing the gateways 180 and 150 with the addresses of each other.

Since the bearer path 122 between subscriber A's access gateway 130 and the trunk gateway 150, and the bearer path 124 between subscribers A and C's access gateways 130 and 180 will no longer be needed once the transfer of subscriber B to subscriber C is complete, the soft switch 100 will instruct the access gateways 130 and 180 and the trunk gateway 150 to release the bearer paths 122 and 124. It will also instruct subscriber A's access gateway 130 to idle subscriber A.

Finally, the soft switch 100 instructs the trunk gateway 150 and subscriber C's access gateway 180 to connect the connect the bearer path 126 in both directions. Subscribers C and B are now in conversation and the soft switch 100 awaits the next supervision signal.

Call Content Interception

Figure 4:
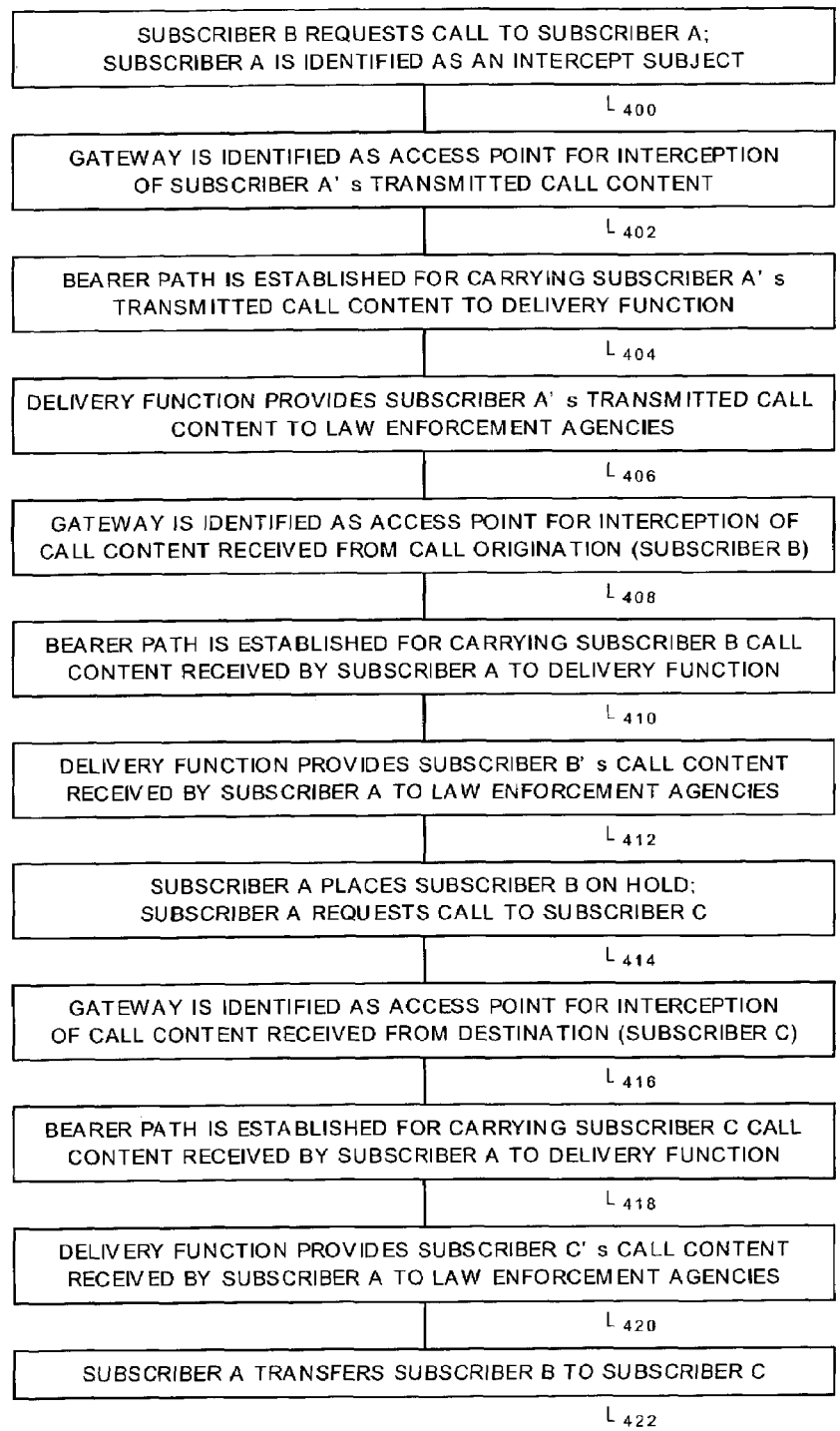
FIG. 4 is a flow chart of an interception process for use with the arrangement illustrated in FIG. 3.

As with the two-party call scenario, the procedure for call interception in the three-party situation is initiated during call setup. When subscriber B places the call to subscriber A, the soft switch 100 receives the request and determines from an internal database that subscriber A has been designated an intercept subject by law enforcement. The switch 100 will now begin the process of intercepting the intercept subject's transmitted call content and the call content the subject receives (or could receive) from other parties, and channel that content to one or more law enforcement agencies (LEAs) 170. To achieve this interception, several other steps, shown in the flow chart of FIG. 4, may occur concurrently with the setup of the call.

Once subscriber A is identified as an intercept subject by the soft switch 100, the soft switch 100 must identify an access point for intercepting the call content transmitted by subscriber A. In FIG. 3, subscriber A connects to the telecommunications system through the access gateway 130 via its line 132. Since subscriber A's transmitted call content will pass through the access gateway 130, and the gateway 130 is responsive to instructions from the soft switch 100, that device can provide an access point 134 for interception (schematically depicted as an oval).

The soft switch 100 will instruct the access gateway 130 and the delivery function 160 to begin the setup a bearer path 162 between them for carrying subscriber A's transmitted call content, providing the access gateway 130 and the delivery function 160 with the addresses of each other to enable them to establish the bearer path 162. The soft switch 100 will also instruct the delivery function 160 to seize the facilities of the law enforcement agencies 170.

The soft switch 100 then instructs the access gateway 130 to establish a local, one-way bearer path connection (internal to the gateway 130) between the line 132 connecting subscriber A to the access gateway 130 and the gateway's local address of the bearer path 162. The soft switch 100 will also instruct the delivery function 160 to establish connections to the bearer path 162 to send the subscriber A's transmitted call content captured at the access gateway 130 to one or more law enforcement agencies 170.

Next, the same procedure is repeated to capture the call content received by subscriber A from the origination of the call. The soft switch 100 identifies a point for obtaining the call content from the call's origination, in this case an access point 154 at the trunk gateway 150, as it is responsive to instructions from the soft switch 100 and provides access to the call content received from the call origination for the duration of the call. The soft switch 100 will instruct the trunk gateway 150 and the delivery function 160 to begin the setup of a bearer path 164 between them for carrying the call content received from the origination, providing the trunk gateway 150 and the delivery function 160 with the addresses of each other to enable them to establish this new bearer path 164.

The soft switch 100 will again instruct the delivery function 160 to seize the facilities of the law enforcement agencies 170 to create a second channel to the law enforcement agencies 170 for the additional call content. Alternatively, the received call content could be added to the transmitted call content of subscriber A, reducing the number of facilities required for the interception.

The soft switch 100 will then instruct the trunk gateway 150 to establish a local, one-way bearer path connection (internal to the trunk gateway 150) between the trunk 152 carrying the call content received from the origination and the gateway's local address of the bearer path 164. The soft switch 100 will also instruct the delivery function 160 to establish connections to the bearer path 164 to send the call content to one or more law enforcement agencies 170.

Subscribers B and A are now in conversation and, in this scenario, subscriber A places subscriber B on hold and dials subscriber C. Now, the content that subscriber A will receive from subscriber C must be provided to the law enforcement agencies 170. Accordingly, the soft switch 100 must identify a point for obtaining this new call content and, since the destination of the call is served by access gateway 180, it will select this location.

The soft switch 100 will instruct the access gateway 180 serving subscriber C and the delivery function 160 to begin the setup of the new bearer path 166, providing them with the addresses of each other. The soft switch 100 will also instruct the delivery function 160 to seize the facilities of the law enforcement agencies 170.

The soft switch 100 then instructs subscriber C's access gateway 180 to establish a local, one-way bearer path connection (internal to the gateway 180) between the line 182 connecting subscriber C and the gateway's local address of the bearer path 166. The soft switch 100 will also instruct the delivery function 160 to establish connections to the bearer path 166 to send the content that subscriber A receives from subscriber C captured at the access gateway 180 to one or more law enforcement agencies 170.

Subscribers A and C are now in conversation. Subscriber A next signals that it wishes to transfer the call on hold (subscriber B) to subscriber C and this is carried out. Once this is accomplished, the soft switch 100 may direct that the bearer path 162 between subscriber A's access gateway 130 and the delivery function 160 be cleared. Further, it can leave the bearer paths 164 and 166 from the trunk gateway 150 and subscriber C's access gateway 180 in place, as desired, until the call between subscriber B and subscriber C is terminated or otherwise modified. Therefore, depending on the requirements of law enforcement and the dictates of the statute (CALEA) and any pertinent regulations, one or more of the bearer paths set up to carry the call content from the subscribers A, B, and C may be deemed unnecessary and can be cleared. Irrespective of the legal requirements for interception, the system and method described here has the ability to provide the call content of any one or more or all of the participants to a call. This holds irrespective of whether the call content of a particular subscriber is being carried by a bearer path to another subscriber.

Direct Access Networks

As previously noted, subscribers in some telecommunications systems connect directly to the network instead of passing through an access device such as the gateways of FIGS. 1 and 3. The interface utilized in such instances is located on the customer's premises. The on-premises location of the interface precludes an interception of call content at such an access device since the device is physically accessible to the subscriber. This physical proximity subjects the interception to the possibility of detection by the subscriber. Therefore, another location—one not accessible to the subscriber—must be selected for obtaining the call content for that particular subscriber. Edge routers, ATM switches, and border elements are devices that can provide an off-premises location for accessing the call content.

Call Setup

In this example, subscriber A wishes to call subscriber B over the network 120 in FIG. 5. An integrated access device 300 ("subscriber A's integrated access device") on the subscriber A's premises notifies the soft switch 100 that subscriber A has gone off-hook. The soft switch 100 then checks the features available to the originating subscriber (subscriber A) and determines that subscriber A is attempting to originate a call. The soft switch 100 then instructs the integrated access device 300 to apply dial tone, collect the dialed digits, and send them to the soft switch 100.

Subscriber A's integrated access device 300 sends the collected digits—the telephone number of subscriber B in this instance—to the soft switch 100. The soft switch 100 translates the collected digits and determines how the call must be routed. Here, the soft switch 100 determines that another integrated access device 310 provides the interface for the called destination and instructs the device 310 to seize the line 312 connecting subscriber B.

The soft switch 100 then directs the two integrated access devices 300 and 310 to begin set up of a bearer path 320 through the network 120. The soft switch 100 provides the devices 300 and 310 with the addresses of each other to enable them to establish the bearer path 320.

The soft switch 100 further instructs subscriber B's integrated access device 310 to alert subscriber B that there is an incoming call. It also tells subscriber A's integrated access device 300 to connect the bearer path 320 to subscriber A's line 302 in both directions. When subscriber B answers, its integrated access device 310 notifies the soft switch 100 and the soft switch 100 then instructs the device 310 to set up bearer path connections between the subscriber B's line 312 and the bearer path 320 in both directions.

Subscribers A and B are now in communication with each other and the telecommunications system awaits the next call supervision signal. When the call is concluded, the bearer path 320 released and the system will await signaling indicating the initiation of the next event.

Call Content Interception

Figure 6:
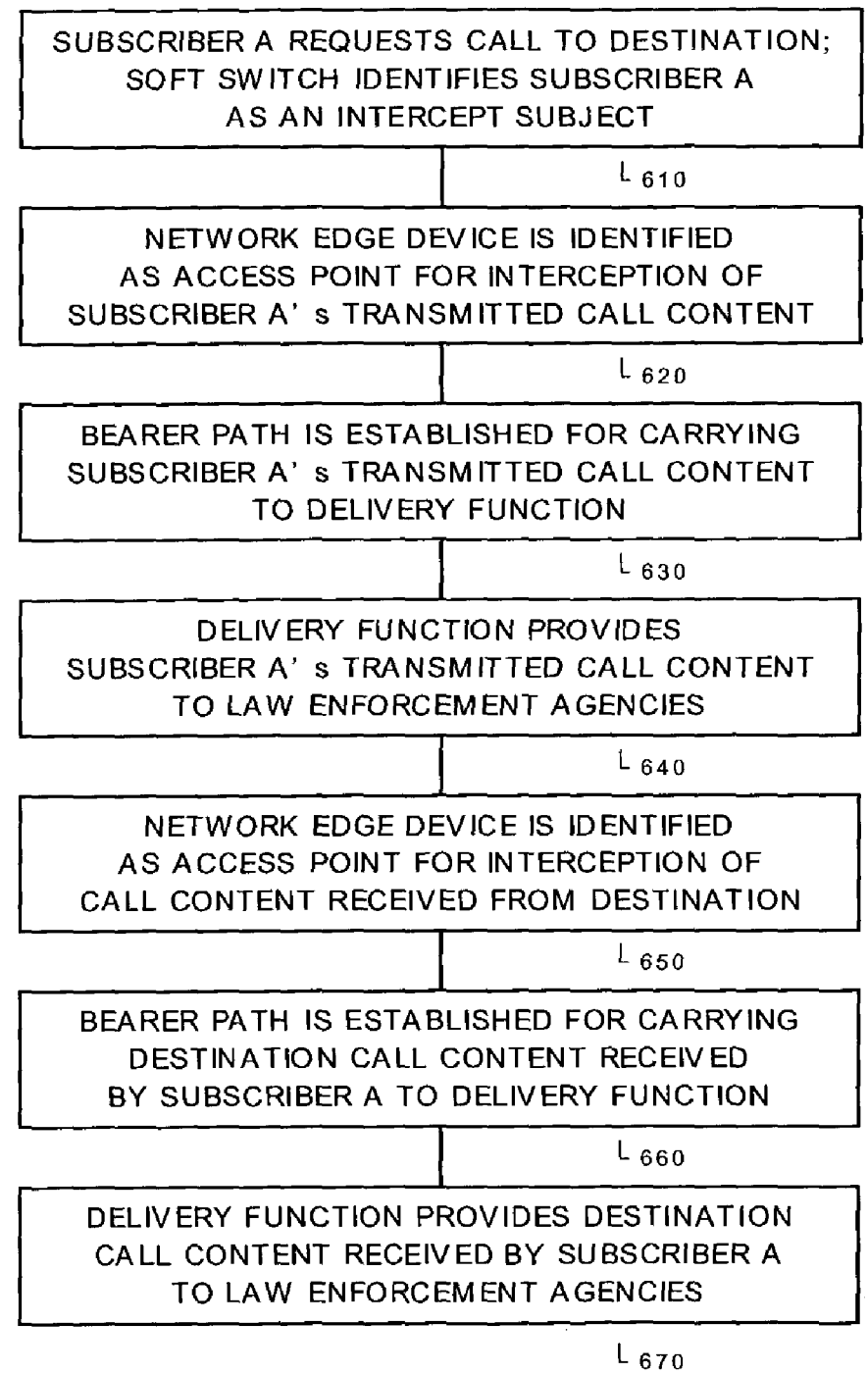
FIG. 6 is a flow chart of an interception process for use with the arrangement illustrated in FIG. 5.

When the soft switch 100 receives a request involving subscriber A, it determines from an internal database that subscriber A has been designated an intercept subject by law enforcement. The switch 100 will now begin the process of intercepting the intercept subject's transmitted call content and the call content the subject receives from other parties, and channel that content to one or more law enforcement agencies (LEAs) 170. The steps for the interception process, set forth in the flow chart of FIG. 6, may occur simultaneously with the set up of the call.

Initially, the soft switch 100 must identify an access point for intercepting the call content transmitted by subscriber A. In FIG. 5, as noted previously, subscriber A connects to the telecommunications system through its integrated access device 300 via its line 302. Because this device is located on subscriber A's premises and an interception here could be detected by the subscriber, it is not suitable as an access point. However, subscriber A's transmitted call content also passes through a network device—an ATM switch 330 ("the ingress ATM switch"), at an off-premises access point 334 (schematically depicted as an oval). The desired call content will pass through the ingress ATM switch 330 for the duration of the telephone call and, further, the switch 330 can be controlled by the soft switch 100 if the proper interface is provided. Those of skill in the art will recognize the need for and are capable of implementing appropriate signaling protocols for soft switch networks in order to provide such an interface, i.e. one which permits a soft switch to send instructions to an ATM switch (or another network device) and receive signals and information in return. However, such a means of control and communication could be provided, using either an existing protocol, an extension of an existing protocol, or an entirely new protocol. Accordingly, control paths 400 representing such a configuration are shown in FIG. 5 running between the soft switch 100 and each ATM switch 330, 340. (Similarly, control paths 750 are shown in FIG. 7.)

The soft switch 100 will then instruct the ingress ATM switch 330 and the delivery function 160 to begin the setup a bearer path 350 between them for carrying subscriber A's transmitted call content. The soft switch 100 provides the ATM switch 330 and the delivery function 160 with the addresses of each other to enable them to establish the bearer path 350. The soft switch 100 will also instruct the delivery function 160 to seize the facilities of the law enforcement agencies 170.

The soft switch 100 then instructs the ingress ATM switch 330 to duplicate the packets received from subscriber A and route them over the bearer path 350 to the delivery function 160. The soft switch 100 will also instruct the delivery function 160 to send subscriber A's transmitted call content to one or more law enforcement agencies 170.

When the soft switch 100 learns that subscriber A is attempting to place a call to a destination, it must identify a second point for intercepting call content originating from that new destination that will be received by subscriber A. Based on the collected digits, the switch 100 understands that this new destination is reached through another ATM switch 340 ("the egress ATM switch"), the switch serving the destination (subscriber B). The egress ATM switch 340 can provide a controllable, off-premises access point 344 (schematically depicted as an oval) for call content received from the destination for the duration of the telephone call.

The soft switch 100 will then instruct the egress ATM switch 340 and the delivery function 160 to begin the setup of a second bearer path 360 between them for carrying the call content received by subscriber A from the destination, providing the egress ATM switch 340 and the delivery function 160 with the addresses of each other. The soft switch 100 will also instruct the delivery function 160 to seize the facilities of the law enforcement agencies 170 to create a second channel to the law enforcement agencies 170 for the additional call content.

The soft switch 100 then instructs the egress ATM switch 340 to duplicate the packets received from subscriber B and route them over the bearer path 360 to the delivery function 160. The soft switch 100 will also instruct the delivery function 160 to send the call content to one or more law enforcement agencies 170. When the call concludes, the connections are torn down and all bearer paths and lines are released.

The foregoing procedure may be employed in a telecommunications system employing session internet protocol, such as that illustrated in FIG. 7. The intercepted call content may be accessed at network devices such as edge routers 710 and 720. There, RTP (real-time transport protocol) streams may be duplicated for transmission to the delivery function 160 and the law enforcement agencies 170. The procedure for interception would otherwise be similar to that set forth in the flow chart of FIG. 6.

Multiple Switches

In the examples discussed to this point, one switch has handled the switching between the parties. In many instances, especially where the parties are separated by a great distance, it is likely that more than one switch would be involved and that the interception points would be controlled by different soft switches. The instructions for establishing the necessary bearer paths to the delivery function would be exchanged among the various switches along with the control signals for setting up the call. This could involve inter-switch signalling protocols such as bearer independent call control (BICC) or session information protocol for telephony (SIP-T).

A network topology for a three-party call was originally discussed using FIG. 3, which depicts a single soft switch 100 controlling the entire interception procedure. The same scenario is shown again in FIG. 8, this time with each of the three access points being controlled by independent soft switches 800, 810, and 820. The three switches would share setup and interception instructions over network links 900 using the appropriate protocols (e.g., BICC and/or SIP-T).

Figure 8:
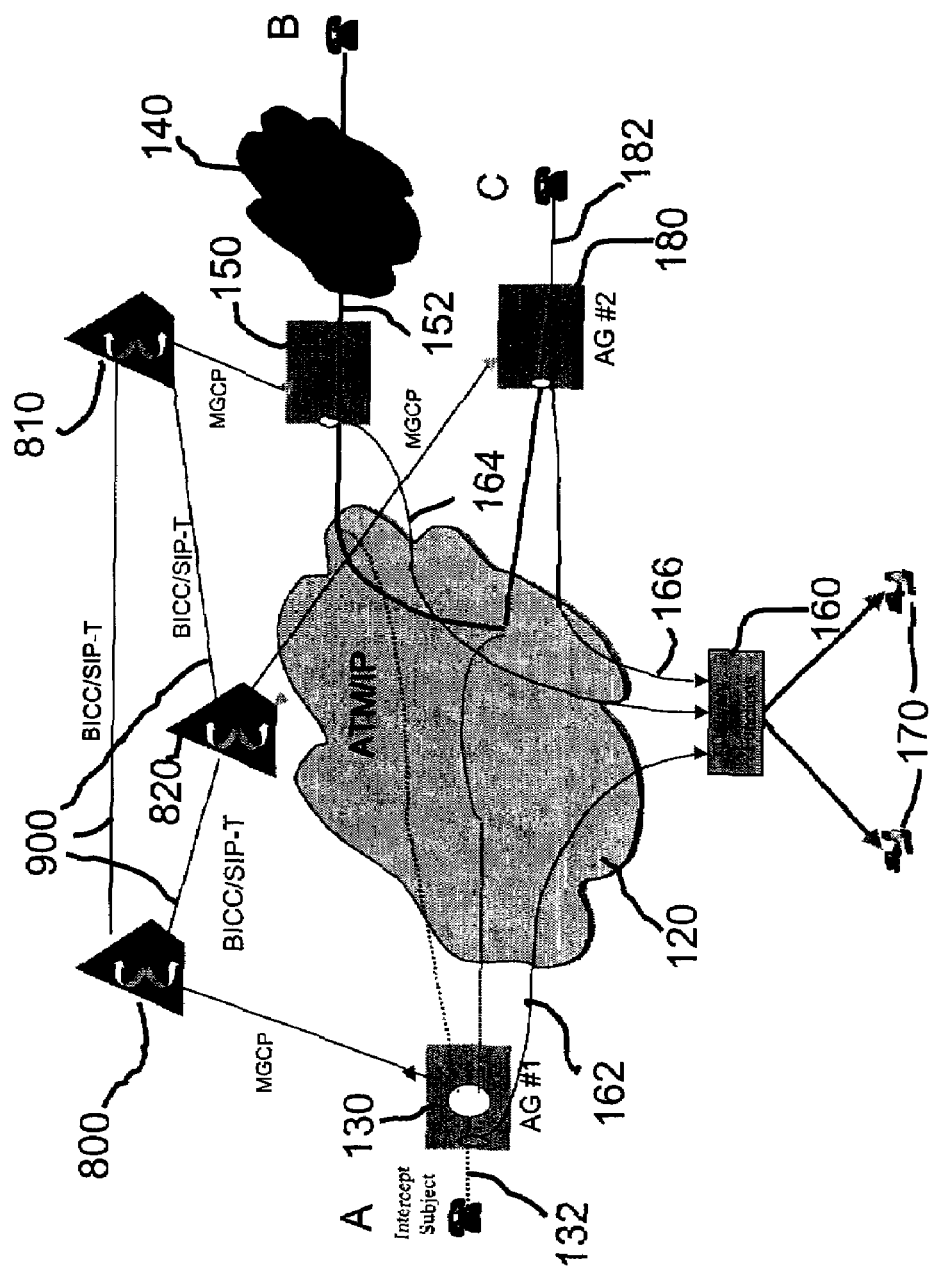
FIG. 8 is a block diagram of a telecommunications system incorporating multiple soft switches and the logical connections for a three-party call interception.

In the example shown in FIG. 8, soft switch 800 controls the access gateway 130 serving subscriber A, soft switch 810 controls the trunk gateway 150 providing the interface trunks to the PSTN 140, and soft switch 820 controls the access gateway 180 serving subscriber C. Because soft switch 800 also controls the delivery function 160, it maintains supervisory control over the interception. The scenario discussed below follows the same sequence as the three-party call scenario explained above. There, subscriber B (a PSTN subscriber) initiated a call to the intercept subject, subscriber A, and subscriber A transferred the call to another party, subscriber C.

Before The Call Transfer

As part of the normal call setup procedures for a call between subscribers A and B, soft switches 800 and 810 exchange the respective addresses of the access gateway 130 and the trunk gateway 150 to establish a bearer path between the two subscribers. Similarly, after subscriber A places subscriber B on hold and places a call to subscriber C, soft switches 800 and 820 exchange the respective addresses of access gateways 130 and 180 to establish a bearer path between subscribers A and C.

Figure 9:
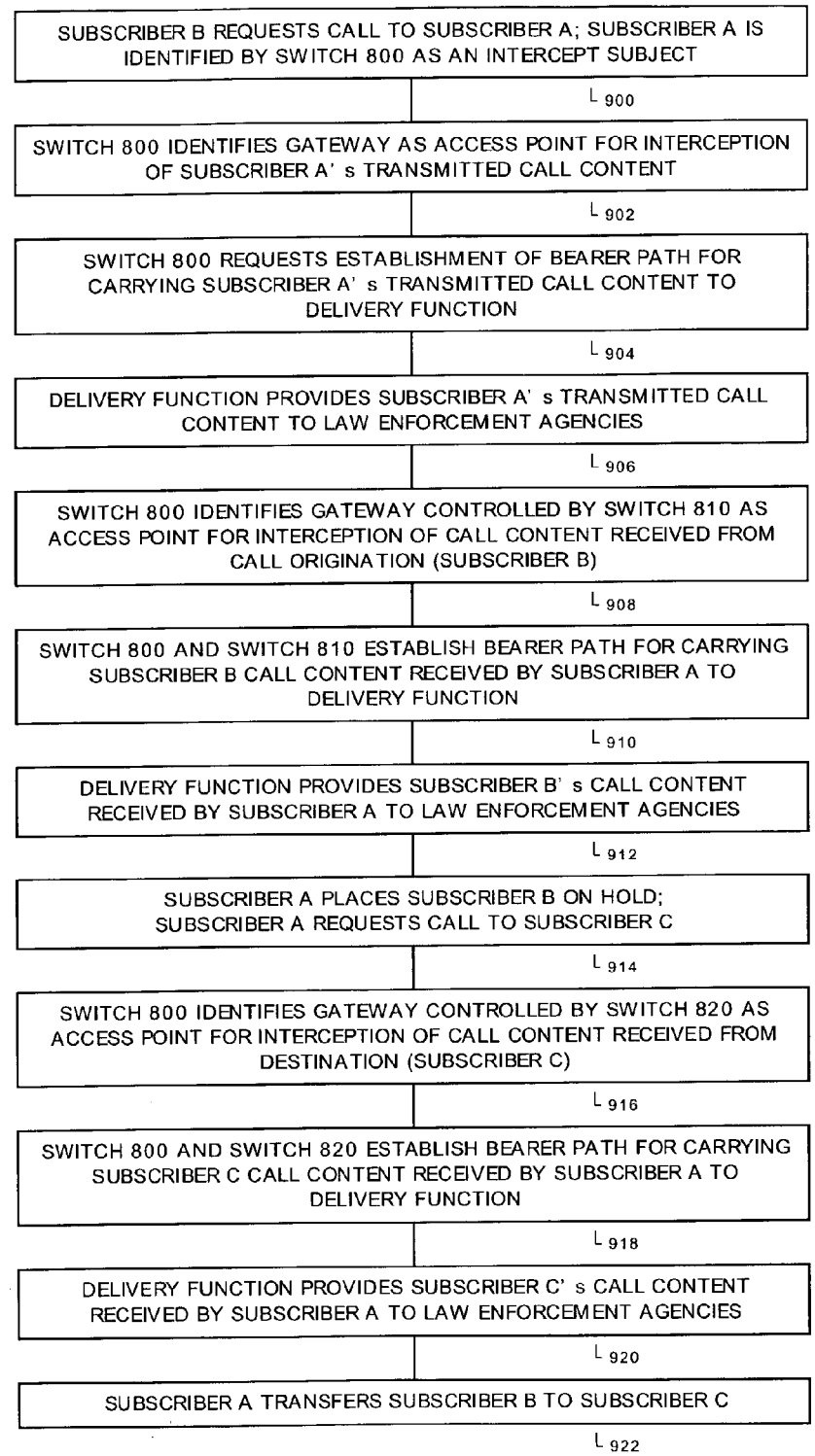
FIG. 9 is a flow chart of an interception process for use with the arrangement illustrated in FIG. 8.

As in the previous single soft switch scenarios, the procedure for call content interception involving multiple soft switches is initiated during call setup. To achieve this interception, several other steps, shown in the flow chart of FIG. 9, may occur concurrently with the setup of the call.

During call setup, soft switch 800 determines that subscriber A is an intercept subject and instructs the access gateway 130 and the delivery function 160 to begin setup of a bearer path 162 between them to carry subscriber A's transmitted call content, providing the access gateway 130 and the delivery function 160 with the addresses of each other to enable them to establish the bearer path 162. Additionally, soft switch 800 instructs the access gateway 130 that a one-way bearer path connection has to be established (internal to the gateway 130) between the line 132 connecting subscriber A to the access gateway 130 and the gateway's local address of the bearer path 162. The soft switch 800 also instructs the delivery function 160 to seize the facilities of the law enforcement agencies 170, so that the transmitted call content of subscriber A and intercepted at the access gateway 130 is delivered to the law enforcement agencies 170 via the delivery function 160.

In order to intercept the call content received by subscriber A from subscriber B, the soft switch 800 notifies soft switch 810 (the switch controlling the access from the PSTN 140 through which the received call content enters the network 120) that a bearer path 164 has to be established between the trunk gateway 150 and the delivery function 160. Since soft switch 800 is controlling the delivery function 160, soft switches 810 and 800 exchange the respective addresses of the trunk gateway 150 and the delivery function 160 to enable them to establish the bearer path 164 between the two. Additionally, soft switch 800 notifies soft switch 810 that a one-way bearer path connection has to be established within the trunk gateway 150 from the trunk 152 (carrying the call content received from subscriber B) to the gateway's local address of the bearer path 164. Finally, soft switch 800 instructs the delivery function 160 to seize the facilities of the law enforcement agencies 170 so that the call content received by subscriber A from subscriber B and intercepted at the trunk gateway 150 is delivered to the law enforcement agencies 170 via the delivery function 160.

Once subscriber C joins the call, the call content received by subscriber A from this new participant must be provided to law enforcement. In order to intercept this call content, soft switch 800 notifies soft switch 820 that a bearer path 166 has to be established between the access gateway 180 and the delivery function 160. Soft switches 820 and 800 exchange the respective addresses of the access gateway 180 and the delivery function 160 to enable them to establish a bearer path 166 between the two. Additionally, soft switch 800 notifies soft switch 820 that a one-way bearer path connection has to be established within the access gateway 180 from the line 182 associated with subscriber C to the gateway's local address of the bearer path 166. Lastly, the soft switch 800 instructs the delivery function 160 to seize the facilities of the law enforcement agencies 170 so that the call content received by subscriber A from subscriber C and intercepted at the access gateway 180 is delivered to the law enforcement agencies 170 via the delivery function 160.

In the foregoing procedure, inter-soft switch signaling protocols such as BICC or SIP-T (or any other existing or new protocols) carry the information necessary to establish the required bearer paths. These signaling protocols may have to be extended to carry the information necessary to convey that a particular call requires one or more one-way connections without disclosing their purpose so that the interception cannot be detected.

The Call Transfer and Subsequent Activity

When the subscriber A initiates the request to transfer the call on hold (subscriber B) to subscriber C, soft switch 800 notifies soft switches 810 and 820 that the respective gateways (i.e., trunk gateway 150 and access gateway 180) have to be instructed to establish a new bearer path between the two, as part of normal call transfer handling procedures. At that point, the bearer path 162 conveying subscriber A's transmitted call content can be released. Further, it can leave the respective bearer paths 164 and 166 from the trunk gateway 150 and subscriber C's access gateway 180 to the delivery function 160 in place, as desired, until the call between subscribers B and C is terminated or otherwise modified.

Although the invention has been described with reference to specific exemplary embodiments thereof, it will be understood that numerous variations, modifications and additional embodiments are possible, and accordingly, all such variations, modifications, and embodiments are to be regarded as being within the spirit and scope of the invention. Also, references specifically identified and discussed herein are incorporated by reference as if fully set forth herein. Accordingly, the drawings and descriptions are to be regarded as illustrative in nature, and not as restrictive.

What is claimed is:

1. A method for enabling an agency to intercept the content of a call transiting a telecommunications network, the call comprising a plurality of components, comprising:
   identifying, for each component, a network device through which that component passes; and
   intercepting the components at the respective identified network devices.

2. A method as set forth in claim 1, where the step of identifying comprises identifying a network device through which the component will pass irrespective of a transfer or a reconfiguration of the call or a portion of the call.

3. A method as set forth in claim 1, further comprising the step of conveying at least one component to a law enforcement agency.

4. A method as set forth in claim 1, where the step of identifying a network device comprises the step of identifying a device controlled by a switch.

5. A method as set forth in claim 1, where
at least one component originates at a subscriber participating in the call; and
the step of identifying a network device comprises the step of associating the subscriber with at least one network device.

6. A method as set forth in claim 5, where the step of identifying a network device comprises the step of identifying a device not accessible to the subscriber providing the component.

7. A method as set forth in claim 6, where the step of identifying a device not accessible to the subscriber comprises the step of configuring a device to be responsive to a soft switch and further comprising the step of providing a control path between the device and the soft switch.

8. A method as set forth in claim 1, where the step of identifying a network device comprises the step of selecting a gateway, an access gateway, a trunk gateway, a portal, an ATM switch, a router, a network edge device, or a border element.

9. A method as set forth in claim 1, where the telecommunications network is responsive to a plurality of soft switches.

10. A method for enabling an agency to intercept at least a portion of the content of subscribers participating in a call over a telecommunications network, the call comprising a plurality of components, comprising:
associating at least one subscriber with at least one network device not accessible to the subscriber, where the network device is controlled by a switch, the network device comprising a gateway, an access gateway, a trunk gateway, a portal, an ATM switch, a router, a network edge device, or a border element;
identifying, for each component, a network device through which the component will pass irrespective of a transfer or a reconfiguration of the call or a portion of the call;
intercepting one or more components at the respective identified network devices; and
conveying at least one component to a law enforcement agency.

11. A system for enabling an agency to intercept the content of a call transiting a telecommunications network, the call comprising a plurality of components, comprising:
means for identifying, for each component, a network device through which that component passes; and
a bearer path connection at each identified network device, the bearer path connection comprising means for intercepting the component.

12. A system as set forth in claim 11, where the means for identifying comprises means for identifying a network device through which the component will pass irrespective of a transfer or a reconfiguration of the call or a portion of the call.

13. A system as set forth in claim 11, further comprising a channel for conveying at least one component to a law enforcement agency.

14. A system as set forth in claim 11, where the network device is responsive to a switch.

15. A system as set forth in claim 11, where
at least one component originates at a subscriber participating in the call; and
the subscriber is associated with at least one network device.

16. A system as set forth in claim 15, where the network device is not accessible to the subscriber.

17. A system as set forth in claim 16, where the network device is responsive to the soft switch and further comprising a control path between the device and the soft switch.

18. A system as set forth in claim 11, where the network device is a gateway, an access gateway, a trunk gateway, a portal, an ATM switch, a router, a network edge device, or a border element.

19. A system as set forth in claim 11, where the telecommunications network is controlled by a plurality of soft switches.

20. A system for enabling an agency to intercept at least a portion of the content of subscribers participating in a call over a telecommunications network, the call comprising a plurality of components, comprising:
at least one network device with which a subscriber has been associated, where the network device is not accessible to the subscriber and responsive to a switch, and where the network device comprises a gateway, an access gateway, a trunk gateway, a portal, an ATM switch, a router, a network edge device, or a border element;
means for identifying, for each component, a network device through which the component will pass irrespective of a transfer or a reconfiguration of the call or a portion of the call;
a bearer path connection at each identified network device, the bearer path connection comprising means for intercepting the component; and
at least one bearer path connected to the bearer path connection, the bearer path comprising means for conveying the component to at least one law enforcement agency.

21. An apparatus for enabling an agency to intercept at least a portion of the content of a subscriber participating in a call over a telecommunications network, the call comprising a plurality of components, comprising:
at least one network device with which a subscriber has been associated, where the network device is not accessible to the subscriber and responsive to a switch, and where the network device comprises a gateway, an access gateway, a trunk gateway, a portal, an ATM switch, a router, a network edge device, or a border element;
means for identifying, for each component, a network device through which the component will pass irrespective of a transfer or a reconfiguration of the call or a portion of the call;
a bearer path connection at each identified network device, the bearer path connection comprising means for intercepting the component; and
at least one bearer path connected to the bearer path connection, the bearer path comprising means for conveying the component to at least one law enforcement agency.

22. A system for enabling an agency to intercept the content of a call transiting a telecommunications network, comprising:
   a plurality of network devices through which the call passes; and
   plurality of bearer path connections located each of the plurality of network devices through which the call passes, the bearer path connections comprising means for intercepting at least a portion of the content of the call on behalf of the agency.

* * * * *